(12) United States Patent
Bayart et al.

(10) Patent No.: US 6,246,513 B1
(45) Date of Patent: Jun. 12, 2001

(54) OPTICAL AMPLIFIER WITH OPTIMAL GAIN EXCURSION FOR DIFFERENT INPUT POWERS

(75) Inventors: Dominique Bayart, Clamart; Bertrand Desthieux, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/225,781

(22) Filed: Jan. 5, 1999

(30) Foreign Application Priority Data

Jan. 8, 1998 (FR) .................................................. 98 00120

(51) Int. Cl.$^7$ ....................................................... H01S 3/00
(52) U.S. Cl. ........................... 359/341; 359/124; 359/337
(58) Field of Search ................................... 359/341, 124, 359/337

(56) References Cited

U.S. PATENT DOCUMENTS

| | | |
|---|---|---|
| 5,436,760 | 7/1995 | Nakabayashi . |
| 5,621,828 * | 4/1997 | Baets et al. .............................. 385/14 |
| 5,706,125 * | 1/1998 | Nakano ................................. 359/341 |
| 5,861,980 * | 1/1999 | Ono ...................................... 359/341 |
| 5,880,874 * | 3/1999 | Shibuya et al. ....................... 359/337 |
| 5,900,970 * | 5/1999 | Kakui ................................... 359/341 |

FOREIGN PATENT DOCUMENTS 2 314 714   1/1998 (GB) .

OTHER PUBLICATIONS

Y. W. Lee et al, Experimental Characterization of a Dynamically gain–Flattened Erbium–Doped Fiber Amplifier, IEEE Photonics Technology Letters, vol. 8, No. 12, Dec. 1996, pp. 1612–1614.

K. Oda et al, "128–Channel, 48—KM Optical Frequency Division Multiplexing Transmission Employing 0.98–Mum Pumped Erbium–Doped Fiber Amplifiers and a Gain Equalizer", Electronics & Communications in Japan, Part I—Communications, vol. 79, No. 12, Dec. 1996, pp. 16–24.

* cited by examiner

*Primary Examiner*—Mark Hellner
(74) *Attorney, Agent, or Firm*—Sughrue, Mion, Zinn, Macpeak & Seas, PLLC

(57) ABSTRACT

The invention relates to optical fiber apparatus comprising an amplifier having optimal gain excursion over a given wavelength band for given input power, and a filter having a bell-shaped transfer function, with the center wavelength of the filter being tunable over a range that is sufficient to enable the gain excursion of the amplifier over said wavelength band to be reduced when the power received by the amplifier is different from said given input power. The invention makes it possible to match amplifier apparatuses to line losses while minimizing overall loss.

16 Claims, 3 Drawing Sheets

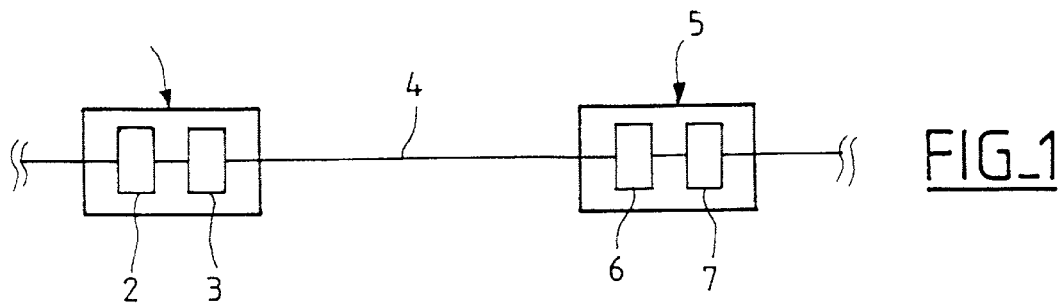
FIG_1
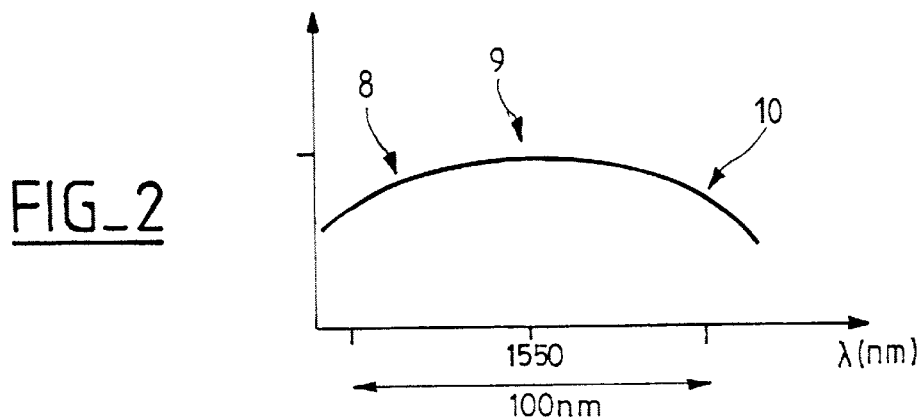
FIG_2
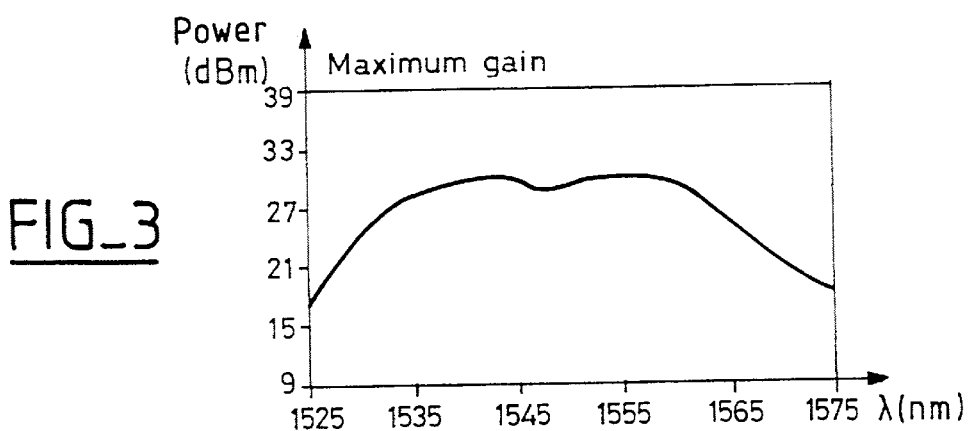
FIG_3
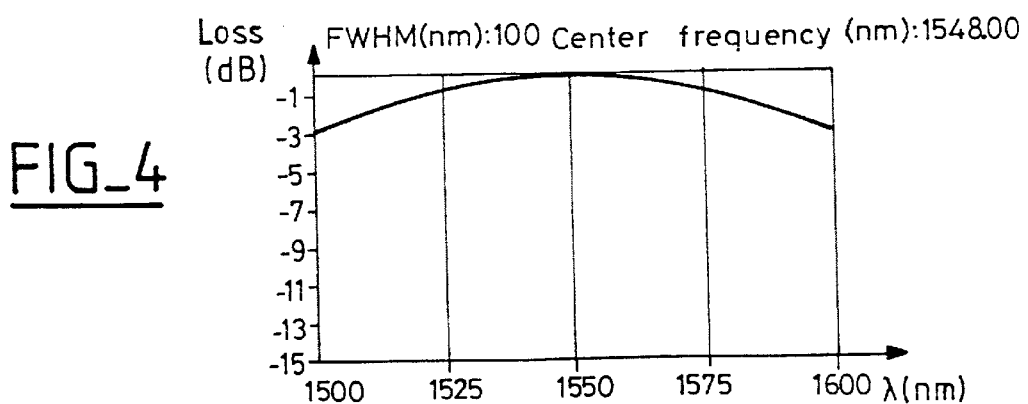
FIG_4

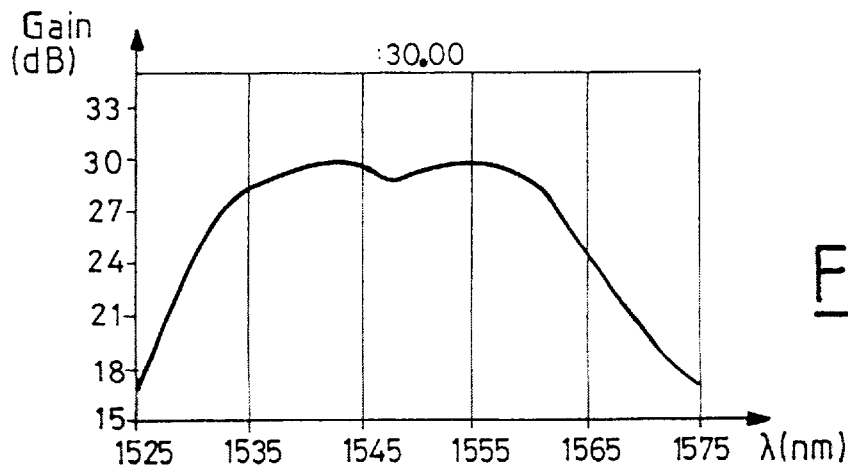
FIG_5
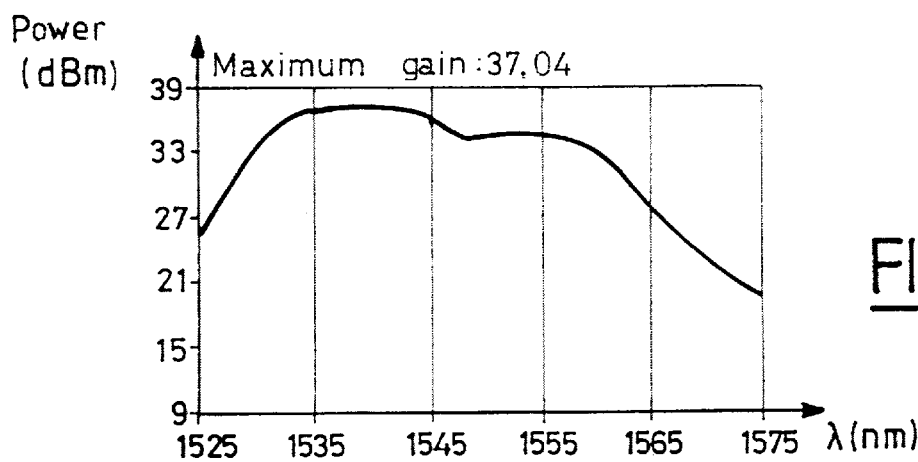
FIG_6
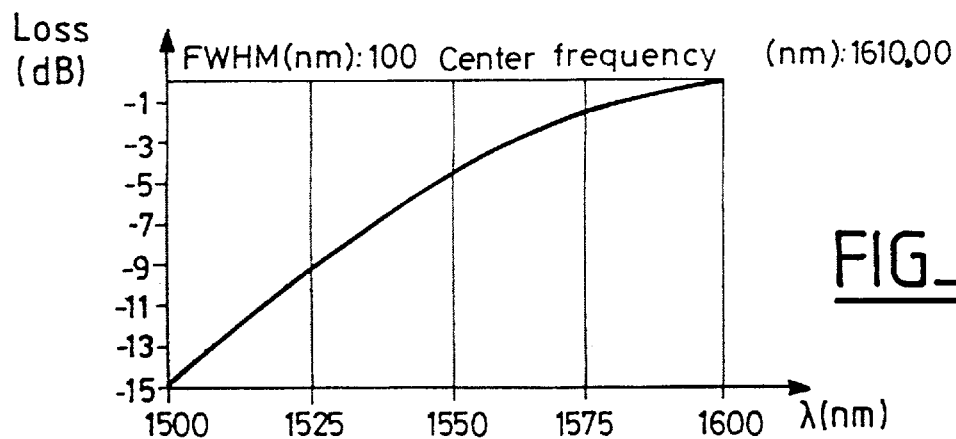
FIG_7

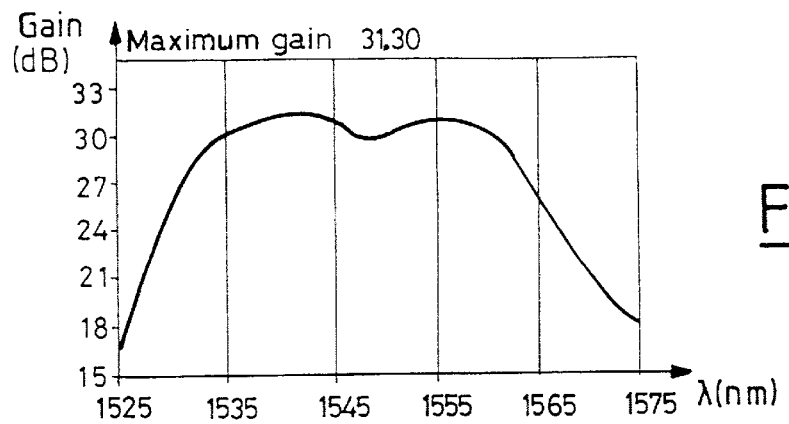
FIG_8
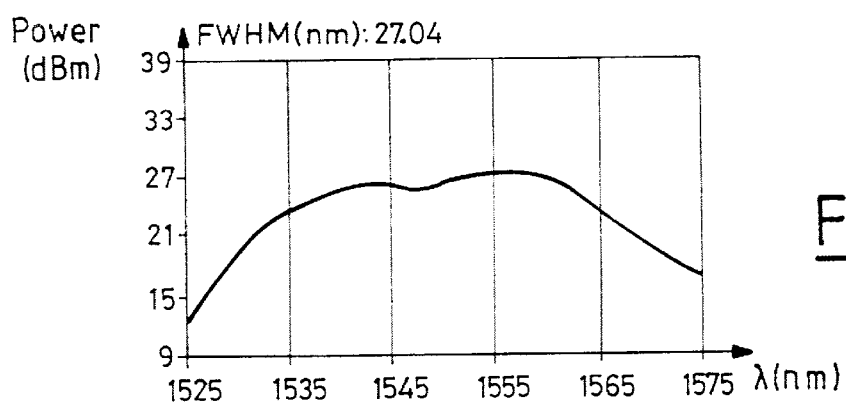
FIG_9
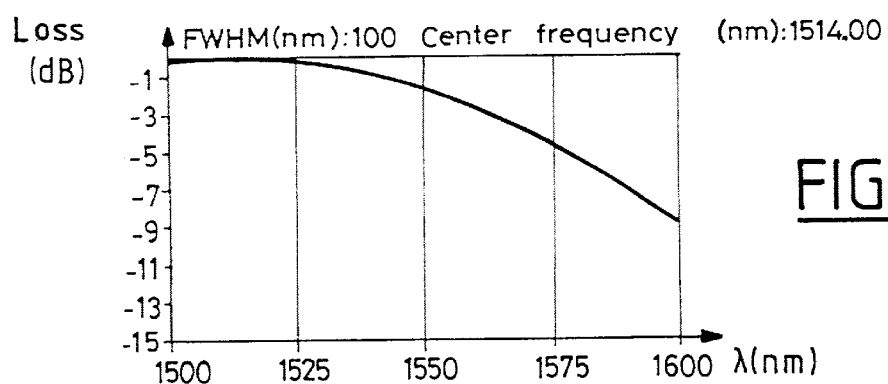
FIG_10
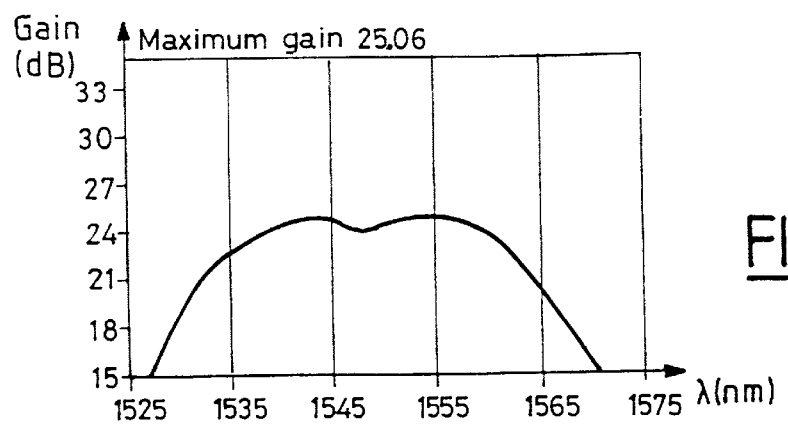
FIG_11

OPTICAL AMPLIFIER WITH OPTIMAL GAIN EXCURSION FOR DIFFERENT INPUT POWERS

The present invention relates to an optical amplifier apparatus presenting optimal gain excursion for different input powers; the invention also relates to a transmission system including such an apparatus, and to a method of matching an optical amplifier to an input power.

BACKGROUND OF THE INVENTION

The invention relates to optical amplifiers, and more particularly to optical amplifiers designed to be used in optical fiber transmission systems with wavelength division multiplexing (WDM). Such amplifiers are used at regular intervals to compensate line losses. The amplifiers over an entire link are preferably identical, presenting gain that is as flat as possible over the entire wavelength band used in the transmission system, for given input power. One of the problems encountered when installing optical fiber transmission systems is that the line losses over the link sections between the various amplifiers present values that are different; under such circumstances, the amplifiers receive different powers, such that system performance can be improved if each amplifier is matched to the line loss of the section of fiber that precedes it, thereby ensuring gain that is flat in spite of variations in applied input power.

To perform such matching, proposals have been made to give each amplifier gain that is greater than the gain theoretically required, and to associate each amplifier with a variable optical attenuator enabling the gain of each assembly comprising an amplifier plus an attenuator to be reduced to the value that is required, as a function of line losses in the section concerned. In that solution, the loss of each optical attenuator is adapted so that the sum of line loss over the section concerned plus the loss in the attenuator is constant. That solution degrades the performance of the link in terms of noise: the gain value selected for each amplifier is the value that corresponds to the maximum line loss possible over the section concerned.

Another solution for matching amplifiers consists in deliberately varying the length of doped optical fiber to match the requirements of the various amplifiers. That solution is complex to implement and it is expensive.

An object of the invention is thus to provide a solution enabling the gain of an optical amplifier to be adapted easily, e.g. as function of line losses over the section of optical fiber that precedes the amplifier in a transmission system, so as to ensure flat gain for the amplifier. Another object of the invention is to minimize losses and maximize signal-to-noise ratio as a result of such matching.

An article by Kyo Inoue et al., entitled "Tunable gain equalization using a Mach Zender optical fiber in multistage fiber amplifiers" published in IEEE Photonics Technology Letters, Vol. 3, No. 8 (1991), proposes using a Mach Zender optical filter to adapt the gain of a three-stage erbium-doped fiber amplifier (EDFA) in a wavelength division multiplex transmission system having 29 channels. In that article, the problem encountered is that of variations in gain or "gain unbalance" in each of the amplifiers over the band of the multiplex. That defect can be accepted in each amplifier, but after several stages of gain, such gain unbalance becomes unaccepted over the band of the multiplex. To mitigate that problem, proposals are made to use the transmittance slope of a Mach Zender filter to compensate variations in gain induced over the band of the multiplex by three EDFA stages.

That article proposes a solution which differs from that of the invention and which applies to a different problem. The problem of that invention is to compensate for accumulated gain unbalance over the bandwidth of the filter, i.e. to equalize gain over the WDM to compensate for the accumulated gain unbalance on the various channels of the WDM.

The solution proposed reflects the problem. Firstly, the proposed circuit has only one filter for three amplification stages: after all the object is to correct equalization as rarely as possible, and only when that turns out be necessary, i.e. when accumulated gain unbalance is large; the article specifies that prior techniques are unsuitable for "adjustable compensation of accumulated gain unbalance". From this point of view, the teaching of that document goes against the solution of the present invention.

Finally, the solution proposed does not enable the amplifier to be matched to the power it receives, but serves at best to equalize accumulated gain in a single direction. This comes from the tuning range of the Mach Zender filter used; the filter cannot be tuned over a wavelength band that is sufficient to change the sign of the slope of the filter; in addition, even if that were possible, changing the sign of the slope of the filter would increase gain unbalance over the wavelength band of the multiplex. From this point of view also, the teaching of that document goes against the solution of the present invention.

Photonics Technologies of Pagewood, New South Wales, Australia, proposes under the trademark AmpFlat a gain-flattening filter. The purpose of that filter is to compensate gain unbalance over the band of an EDFA; it is designed to be added to most EDFAs for the purpose of improving performance. The filter is available in two forms: a "laboratory" form in which it is possible to adjust filter parameters, e.g. center frequency and extinction; and a "fixed" form in which the parameters are fixed. It is stated that the fixed form is available "when the response required of the filter is well defined" in "an environmentally-stable miniaturized version". That filter seeks to solve the same problem as does the above-mentioned article by Kyo Inoue, and its teaching goes against adjusting a filter on site. In any event, as in the above-specified article, it suggests using the filter to compensate for gain unbalance over the band of the multiplex, but not for matching the amplifier as a function of the powers it receives.

OBJECTS AND SUMMARY OF THE INVENTION

Consequently, the invention proposes an amplifier apparatus which provides gain that is flat independently of input power over the entire working bandwidth of the amplifier; in its application to a wavelength division multiplexed transmission system, the invention makes it possible in simple manner to match the amplifier to line losses in the section preceding it, without degrading performance in terms of signal-to-noise ratio.

More precisely, the invention provides an optical fiber transmission system operating in a given wavelength band, the system comprising a plurality of line fiber sections interconnected by amplifier apparatuses, wherein each amplifier apparatus comprises both an amplifier having gain excursion that is optimal in said band for input power corresponding to a preceding line fiber section having average loss, and a filter presenting a bell-shaped transfer function, with the center wavelength thereof being tunable over a range that is sufficient to reduce the gain excursion of the amplifier over said band for powers received by the amplifier on either side of said input power.

In an embodiment, the system is a wavelength division multiplex transmission system, and the wavelength band is the wavelength band of the multiplex.

In an embodiment, the amplifier is a doped optical amplifier having a single fiber section, and the filter is disposed after said section.

In another embodiment, the amplifier is a doped optical fiber amplifier having a plurality of fiber sections, and the filter is disposed before the last fiber section.

Advantageously, the center wavelength is tunable over a range that is sufficient to change the sign of the mean slope of the transfer function of the filter in said wavelength band.

Preferably, the slope of the spectrum response of the filter is a monotonic decreasing function of wavelength.

The invention also provides an amplifier apparatus comprising both an amplifier having optimal gain excursion in a given wavelength band for given input power, and a filter having a bell-shaped transfer function whose center wavelength is tunable over a range that is sufficient to enable the gain excursion of the amplifier over said wavelength band to be reduced for powers received by the amplifier on either side of said input power.

In an embodiment, the amplifier is a doped optical fiber amplifier having a single fiber section, and the filter is disposed after said section.

In another embodiment, the amplifier is a doped optical fiber amplifier having a plurality of fiber sections, and the filter is disposed before the last fiber section.

Advantageously, the center wavelength is tunable over a range that is sufficient to change the sign of the mean slope of the transfer function of the filter in said wavelength band.

Preferably, the slope of the spectrum response of the filter is a monotonic decreasing function of wavelength.

Finally, the invention also provides a method of matching an optical amplifier to an input power, the method comprising the steps of:

selecting an amplifier having gain excursion that is optimal for a given input power;

associating the amplifier with a filter having a bell-shaped transfer function with a center wavelength that is tunable; and tuning the center wavelength of the filter to reduce the gain excursion of the amplifier over said wavelength band as a function of the power received by the amplifier.

Advantageously, the center wavelength is tunable over a range that is sufficient to enable the sign of the mean slope of the transfer function of the filter to be changed in said wavelength band.

Preferably, the slope of the spectrum response of the filter is a monotonic decreasing function of wavelength.

BRIEF DESCRIPTION OF THE DRAWINGS

Other characteristics and advantages of the invention appear on reading the following description of embodiments, given by way of example and with reference to the accompanying drawings, in which:

FIG. 1 is a diagram of a portion of a transmission system including an amplifier apparatus of the invention;

FIG. 2 shows the transfer function of the filter of FIG. 1;

FIG. 3 shows the transfer function of the amplifier for a given input power;

FIG. 4 shows the transfer function of the filter for a given input power;

FIG. 5 shows the transfer function of the amplifier apparatus for a given input power;

FIG. 6 to 8 are similar to FIGS. 3 to 5 for input power below the given power; and FIGS. 9 to 11 are analogous to FIGS. 3 to 5, for input power greater than the given power.

MORE DETAILED DESCRIPTION

In order to enable an amplifier to be matched to line loss in the preceding section of a link, instead of changing the gain of the amplifier, the invention proposes selecting an amplifier having gain excursion that is optimal for the mean inlet power and associating the amplifier with a filter enabling gain variations to be corrected for different input powers. In other words, the amplifier presents gain that is as flat or as equalized as possible for the mean input power. The filter is a filter whose transfer function is bell-shaped, with its center wavelength being tunable over a range that is large enough to be able to correct for variations in gain. In other words, the filter is tunable over a range that is large enough to ensure that in the wavelength band of the link, the slope of the filter transfer function can change sign. This makes it possible to compensate for variation caused in gain by changes in input power applied to the amplifier.

FIG. 1 is a diagram of a transmission system including amplifier apparatus of the invention. The figure shows a section of line fiber 4 extending between two amplifier apparatuses 1 and 5. Each amplifier apparatus comprises an amplifier 2 or 6, typically an EDFA, and the amplifier is associated with a respective filter 3 or 7. When the amplifier has only one fiber section, the filter is preferably connected after the fiber section. If the amplifier has a plurality of fiber sections, then the filter is preferably located ahead of the last fiber section since this is advantageous from the points of view of noise and output power from the amplifier. By way of example the filter may be an interference filter.

FIG. 2 is a graph showing the transfer function of the FIG. 1 filter. The transfer function is bell-shaped: in other words, the mean value of the slope of the spectrum response of the filter within the wavelength band of the transmission system can be negative, zero, or positive, depending on how the center frequency of the filter is tuned, as explained below. Advantageously, the slope of the spectrum response of the filter is a decreasing function of wavelength, since this makes it possible to increase the range of input powers that can be compensated.

In the example of FIG. 2, the filter has a left flank 8 of positive slope, a central portion 9 of substantially zero slope, and a right flank 10 of negative slope. The width of the filter is sufficient to ensure that each flank and the center portion of the filter can cover the working band of the amplifier apparatus. When the filter is used in a wavelength division multiplexed transmission system, the working band corresponds to the wavelength band of the multiplex. In the example of FIG. 2, the full width at half maximum (FWHM) bandwidth of the filter is 100 nm, and it is suitable for use with a wavelength division multiplex transmission system whose multiplex has a bandwidth of 32 nm.

The frequency or center wavelength of the filter is tunable over a range of wavelengths that is sufficient to enable the gain excursion of the amplifier over said band to be corrected for powers received by the amplifier on either side of said input power, as explained below in the present description. In the example of FIG. 2, the center wavelength of the untuned filter is 1548 nm, and its tuning range is 34 nm towards shorter wavelengths and 64 nm towards longer wavelengths.

The FIG. 1 apparatus operates as follows. The amplifier is selected to have flat gain for given power that it is assumed will be applied to the input of the amplifier apparatus. For a wavelength division multiplex optical fiber transmission system, this given wavelength is determined, for a given amplifier apparatus 5, on the basis of average line losses over the preceding section of fiber 4, i.e. since the preceding amplifier apparatus 1.

Under such circumstances, applying greater power to the input of the amplifier apparatus causes the amplifier to be oversaturated, so the longer wavelengths are more amplified. Conversely, applying lower power causes the amplifier to be unsaturated so the shorter wavelengths are more amplified.

The invention is based on the surprising fact that these variations in gain flatness can be compensated merely by means of a bell-shaped filter. When the power applied to the input of the amplifier is substantially equal to the power for which gain is flat, the center wavelength of the filter is adjusted so that the wavelength band of the transmission system lies in the central portion of the filter. As a result, the filter modifies the appearance of the gain of the amplification apparatus little, if at all. Furthermore, it adds little loss, with insertion loss into the filter being conventionally relatively small, i.e. about 1 dB. This appears in FIGS. 3 to 5. FIG. 3 shows the appearance of the transfer function of the amplifier, with wavelength being plotted along the abscissa in nanometers and with gain being plotted up the ordinate in dBm. FIG. 4 shows the appearance of the transfer function of the filter when tuned to the center wavelength, with loss in dBm being plotted up the ordinate and wavelength Hen nanometers along the abscissa. FIG. 5 shows the overall transfer function of the amplifier apparatus, with gain in dBm being plotted up the ordinate and wavelength in nanometers along the abscissa. It can be seen that the presence of the filter has practically no effect on the appearance of the gain which remains flat. The loss added by the filter is limited, and practically zero.

When the power applied to the amplifier apparatus is lower than the given power (i.e. line losses are greater than average line losses), then the gain of the amplifier is no longer flat, but falls off at longer wavelengths, so that the center wavelength of the filter needs to be adjusted so that the wavelength band of the transmission system is to be found on the left flank of the filter. The slope of the filter then compensates gain variation in the amplifier, and the amplifier apparatus as a whole presents gain that is flat. FIG. 6 shows the appearance of the gain of the EDFA under such circumstances for a change in input power of 5 dB, using the same coordinates as FIG. 3. FIG. 7 shows the appearance of filter losses when the filter is tuned so that the working wavelength, e.g. centered on 1550 nm, is to be found on the left flank of the filter. The coordinates are the same as those of FIG. 4. FIG. 7 corresponds to adjusting the center wavelength of the filter to +62 nm. FIG. 8 shows the gain of the amplifier apparatus, i.e. the product of the transfer functions of FIGS. 6 and 7, using coordinates identical to those of FIG. 5. It can be seen that gain is again quite flat over the band of the multiplex, and that the attenuation due to the filter is about 3 dBm.

Conversely, when the power applied to the amplifier apparatus is greater than the given power, i.e. when line losses are smaller than average losses, the gain of the amplifier is no longer flat, but falls off at shorter wavelengths, so the center wavelength of the filter is adjusted to move the wavelength band of the transmission system to the right flank of the filter. The slope of the filter then compensates for the variation in the gain of the amplifier, and overall the amplifier apparatus again presents gain that is flat. FIGS. 9 to 11 are views analogous to FIGS. 6 to 8, with the same coordinates. FIG. 9 shows the appearance of the gain of the EDFA. For a change in input power of 5 dB, this gain increases with increasing wavelength. FIG. 10 shows the appearance of filter losses, when the filter is tuned so that the working wavelength, in this example centered on 1550 nm, lies on the right flank of the filter, i.e. the center wavelength of the filter is adjusted by −34 nm. FIG. 11 shows the gain of the amplifier apparatus: it can be seen again that the gain is quite flat over the band of the multiplex, while the attenuation due to the filter is of the order of 3 dBm.

The invention thus makes it possible to adapt the gain of amplifier apparatuses simply and effectively as a function of the input power that may be applied thereto.

Unlike the prior art devices described above, the invention does not seek to equalize gain under the operating conditions of the EDFA: for given power, the power corresponding to average line losses, the amplifier presents gain that is optimized and flat. In contrast, it does propose compensating for variations in gain slope for powers that are different from the expected theoretical power. It relies on the surprising observation that a simple filter can perform such compensation, in spite of the appearance of gain variations.

In addition, unlike known apparatuses, the invention makes it possible to compensate for gain variations in either direction, by appropriately selecting the range over which the center wavelength of the filter can be varied. When the slope of the spectral response of the filter is a monotonic decreasing function of wavelength, the greater the variation in the center wavelength of the filter, the greater the range of input powers that can be corrected.

Naturally, the invention is not limited to the examples and embodiments described and shown, but can be varied in numerous ways by the person skilled in the art. Thus, the invention can be used in a context other than wavelength division multiplex transmission systems, and quite generally to provide an amplifier with flat gain over a wide band of input powers. The bell-shape of the filter is not limited to that shown in FIG. 2: the transfer function of the filter could be built up from straight line segments, for example.

What is claimed is:

1. An optical fiber transmission system operating in a given wavelength band, the system comprising:

a plurality of line fiber sections interconnected by amplifier apparatuses, wherein each amplifier apparatus comprises:

an amplifier having gain excursion that is optimal in said band for an input power corresponding to a preceding line fiber section having average loss; and a filter presenting a bell-shaped transfer function, with the center wavelength thereof being tunable over a range that is sufficient to reduce the gain excursion of the amplifier over said band for powers received by the amplifier on either side of said input power, wherein a width of the bell-shaped transfer function is at least such that both a first portion left of the center wavelength and a second portion right of the center wavelength are wide enough to include substantially all of said wavelength band.

2. A system according to claim 1, wherein the system is a wavelength division multiplex transmission system, and wherein the wavelength band is the wavelength band of the multiplex.

3. A system according to claim 1, wherein the amplifier is a doped optical amplifier having a single fiber section, and wherein the filter is disposed after said single fiber section.

4. A system according to claim 1, wherein the amplifier is a doped optical fiber amplifier having a plurality of fiber sections, and wherein the filter is disposed before a last one of said fiber sections.

5. A system according to claim 1, wherein the center wavelength is tunable over a range that is sufficient to change the sign of the mean slope of the transfer function of the filter in said wavelength band.

6. A system according to claim 1, wherein the slope of the spectrum response of the filter is a monotonic decreasing function of wavelength.

7. An amplifier apparatus comprising:
   an amplifier having optimal gain excursion in a given wavelength band for given input power; and
   a filter having a bell-shaped transfer function whose center wavelength is tunable over a range that is sufficient to enable the gain excursion of the amplifier over said wavelength band to be reduced for powers received by the amplifier on either side of said input power, wherein a width of the bell-shaped transfer function is at least such that both a first portion left of the center wavelength and a second portion right of the center wavelength are wide enough to include substantially all of said wavelength band.

8. Apparatus according to claim 7, wherein the amplifier is a doped optical fiber amplifier having a single fiber section, and wherein the filter is disposed after said single fiber section.

9. Apparatus according to claim 7, wherein the amplifier is a doped optical fiber amplifier having a plurality of fiber sections, and wherein the filter is disposed before a last one of said fiber sections.

10. Apparatus according to claim 7, wherein the center wavelength is tunable over a ran that is sufficient to change the sign of the mean slope of the transfer function of the filter in said wavelength band.

11. A system according to claim 7, wherein the slope of the spectrum response of the filter is a monotonic decreasing function of wavelength.

12. A method of matching an optical amplifier to an input power, the method comprising the steps of:
   selecting an amplifier having gain excursion that is optimal for a given input power;
   associating the amplifier with a filter having a bell-shaped transfer function with a center wavelength that is tunable; and
   turning the center wavelength of the filter, to reduce the gain excursion of the amplifier over said wavelength band, according to an actual power received by the amplifier.

13. A method according to claim 12, wherein the center wavelength is tunable over a range that is sufficient to enable the sign of the mean slope of the transfer function of the filter to be changed in said wavelength band.

14. A method according to claim 12, wherein the slope of the spectrum response of the filter is a monotonic decreasing function of wavelength.

15. An optical fiber transmission system operating in a given wavelength band, the system comprising:
   a plurality of line fiber sections interconnected by amplifier apparatuses, wherein each amplifier apparatus comprises:
   an amplifier having gain excursion that is optimal in said band for an input power corresponding to a preceding line fiber section having average loss; and
   a filter presenting a bell-shaped transfer function, with the center wavelength thereof being tunable over a range that is sufficient to reduce the gain excursion of the amplifier over said band for powers received by the amplifier on either side of said input power, wherein the center wavelength is tunable over a range that is sufficient to change the sign of the mean slope of the transfer function of the filter in said wavelength band while the transfer function of the filter still covers substantially all of said wavelength band.

16. An amplifier apparatus comprising:
   an amplifier having optimal gain excursion in a given wavelength band for given input power; and
   a filter having a bell-shaped transfer function whose center wavelength is tunable over a range that is sufficient to enable the gain excursion of the amplifier over said wavelength band to be reduced for powers received by the amplifier on either side of said input power, wherein the center wavelength is tunable over a range that is sufficient to change the sign of the mean slope of the transfer function of the filter in said wavelength band while the transfer function of the filter still covers substantially all of said wavelength band.

* * * * *